(12) United States Patent
Kim

(10) Patent No.: US 7,320,077 B2
(45) Date of Patent: Jan. 15, 2008

(54) POWER SUPPLY CONTROLLING APPARATUS OF A DEVICE CONNECTED TO A SERIAL BUS

(75) Inventor: Hyeong Seog Kim, Osan-si (KR)

(73) Assignee: LG Electronics Inc., Seoul (KR)

( * ) Notice: Subject to any disclaimer, the term of this patent is extended or adjusted under 35 U.S.C. 154(b) by 694 days.

(21) Appl. No.: 10/194,069

(22) Filed: Jul. 15, 2002

(65) Prior Publication Data
US 2003/0070103 A1    Apr. 10, 2003

(30) Foreign Application Priority Data
Sep. 15, 2001    (KR) .............................. 2001-57036

(51) Int. Cl.
*G06F 1/32*    (2006.01)
*G06F 1/26*    (2006.01)
(52) U.S. Cl. ...................... 713/300; 713/320; 713/323; 713/324; 713/340
(58) Field of Classification Search .................. 700/22; 713/310, 324
See application file for complete search history.

(56) References Cited

U.S. PATENT DOCUMENTS

| | | | | |
|---|---|---|---|---|
| 5,799,196 A | * | 8/1998 | Flannery | 713/320 |
| 5,818,948 A | * | 10/1998 | Gulick | 381/77 |
| 5,938,770 A | * | 8/1999 | Kim | 713/300 |
| 6,105,097 A | * | 8/2000 | Larky et al. | 710/314 |
| 6,105,143 A | * | 8/2000 | Kim | 713/324 |
| 6,119,194 A | * | 9/2000 | Miranda et al. | 710/306 |
| 6,125,455 A | * | 9/2000 | Yeo | 714/14 |
| 6,201,816 B1 | * | 3/2001 | Wilson | 370/452 |
| 6,272,644 B1 | * | 8/2001 | Urade et al. | 713/320 |
| 6,308,278 B1 | * | 10/2001 | Khouli et al. | 713/323 |
| 6,363,491 B1 | * | 3/2002 | Endo | 713/310 |
| 6,427,183 B1 | * | 7/2002 | Seidenberg | 710/316 |
| 6,460,143 B1 | * | 10/2002 | Howard et al. | 713/323 |
| 6,665,801 B1 | * | 12/2003 | Weiss | 713/300 |
| 6,924,901 B1 | * | 8/2005 | Otsubo et al. | 358/1.13 |

FOREIGN PATENT DOCUMENTS

| | | |
|---|---|---|
| CN | 2268271 Y | 11/1997 |
| CN | 1043930 C | 6/1999 |
| JP | 11-305880 | 10/1999 |

* cited by examiner

*Primary Examiner*—Rehana Perveen
*Assistant Examiner*—Fahmida Rahman
(74) *Attorney, Agent, or Firm*—Ked & Associates, LLP

(57) ABSTRACT

The present invention relates to an apparatus and method of a Universal Serial Bus (USB) device to control power supply for USB devices coupled to a host through a USB and to control power supply for the coupled USB devices based on whether the USB devices are operative. A power supply controlling apparatus and method can interrupt power supply for an USB internal circuitry and other coupled USB devices if a state of signals on corresponding data lines coupled to a host represents inoperative state of the host or individual USB to reduce or prevent overall power consumption.

18 Claims, 5 Drawing Sheets

POWER SUPPLY CONTROLLING APPARATUS OF A DEVICE CONNECTED TO A SERIAL BUS

BACKGROUND OF THE INVENTION

1. Field of the Invention

The present invention relates to an apparatus of a Universal Serial Bus (USB) device to control power supply for the USB device, and in particular, to control power supply for a plurality of coupled USB devices.

2. Background of the Related Art

There are many bus standards for connecting an external peripheral device to a personal computer (PC). The USB, one of the bus standards, ensures high-speed serial data communication and convenient physical connection to a port. At this time, it is possible to connect 127 USB devices to a single USB port through a USB Hub, etc. Owing to such features, peripheral devices such as a mouse, a keyboard, a printer, a modem, a joystick and so on are adopting the USB interface USB i/F more and more.

The USB consists of four signal lines, two lines D+/D− for carrying data signals and two power lines +5V/GND. FIG. 1 shows a PC (host) and several USB devices 110 connected to the PC through a USB Hub 100 according to the related art. The USB Hub 100 is fed with necessary electric power by the PC through a USB or by an AC adapter converting an AC power to DC.

However, the related art USB hub has various disadvantages. The related art USB Hub 100 continues to supply electric power for the connected USB devices 110 as well as an internal circuitry 101 until it is commanded to turn off power for those devices. However, a connected USB device may be tuned off and power supplied is therefore wasted. Further, the related art USB Hub 100 continues to supply electric power for the connected USB devices 110 as well as an internal circuitry 101 until it is turned off, although a connected host USB has a failure. However, a connected USB device can not perform valid operations when data communication with a host is abnormal or fails. Therefore, while a connected host can not communicate, electric power supplied for a USB device is wasting.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a power controlling apparatus of a USB device that controls power supply for a plurality of coupled USB devices based on whether each of the USB devices are operative.

Another object of the present invention is to provide a power controlling apparatus of a USB device that turns off electric power for an individual USB device based on data signals or data line operations of a corresponding USB device.

Another object of the present invention is to provide a power controlling apparatus of a USB device that turns off electric power for all coupled USB devices based on data signals or data line operations of a corresponding host.

Another object of the present invention is to provide a power controlling apparatus of a USB device that determines whether electric power is unnecessary and then shuts off electric power being supplied for internal circuitry and/or other coupled devices if determined as unnecessary to reduce electric power consumption.

To achieve at least the above objects in a whole or in part and in accordance with purposes of the present invention, as embodied and broadly described herein, there is provided a power supply controlling apparatus embedded in a device capable of communicating data with a connected host that includes a data detector that outputs a power control signal in response to state of signals carried by data lines coupled to the host, and a controller that controls power supply for at least one of an internal circuitry and other coupled devices based on the outputted power control signal.

To further achieve at least the above objects in whole or in part, there is provided a power supply controlling apparatus embedded in a device capable of communicating data with a host that includes a data detector that detects signals carried by data lines coupled to the host, interprets the detected signals, and outputs a power control signal based on the interpreted information, and a controller that controls power supply for at least one of an internal circuitry and other connected devices based on the outputted power control signal.

To further achieve at least the above objects in a whole or in part, there is provided a power supply controlling apparatus embedded in a device capable of communicating data with a host that includes a data detector that detects a signal indicative of power consumption, the signal being carried via Universal Serial Bus (USB) data lines connected to the host, wherein the data detector outputs a power control signal based on whether the signal is detected, and a controller that controls power supply for coupled USB devices based on the outputted power control signal.

To further achieve at least the above objects in a whole or in part, there is provided a computer system that includes a host computer, a plurality of Universal Serial Bus (USB) devices coupled to the host computer, each device selectively having at least a status of active and inactive, wherein data signals are communicated between the host computer and the USB devices, and a controller that analyzes the data signals, wherein power supply to at least one of the USB devices is controlled based on the analysis.

To further achieve at least the above objects in a whole or in part, there is provided a method of controlling power to devices connected to a host computer that includes analyzing signals transmitted via data lines of a Universal Serial Bus (USB) interface, determining a power control signal based on the analysis, and selectively reducing power supplied to at least one of the devices based on the power control signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
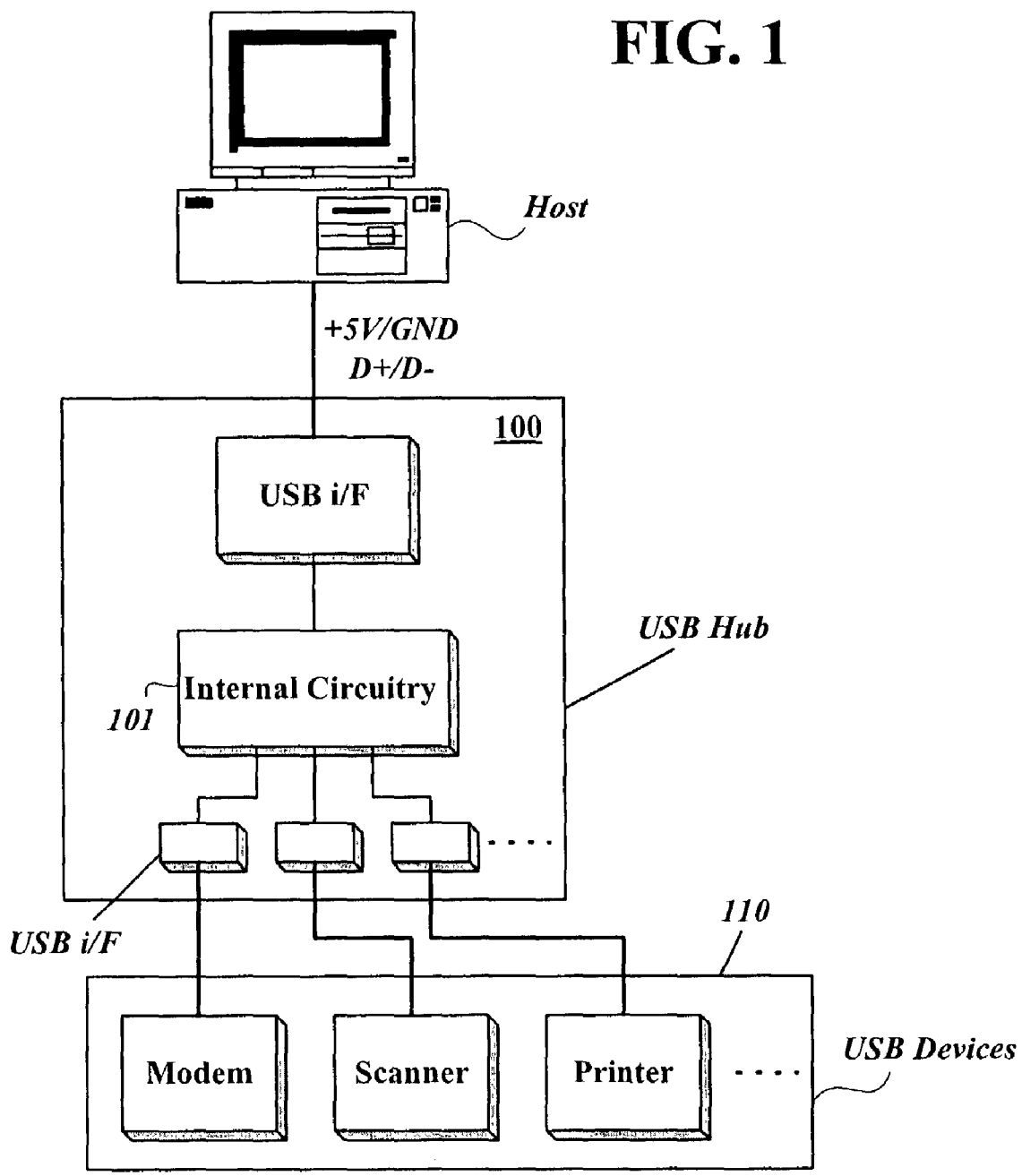
FIG. 1 is a diagram that shows a PC and several USB devices connected to the PC through a USB Hub according to the related art.
Figure 2:
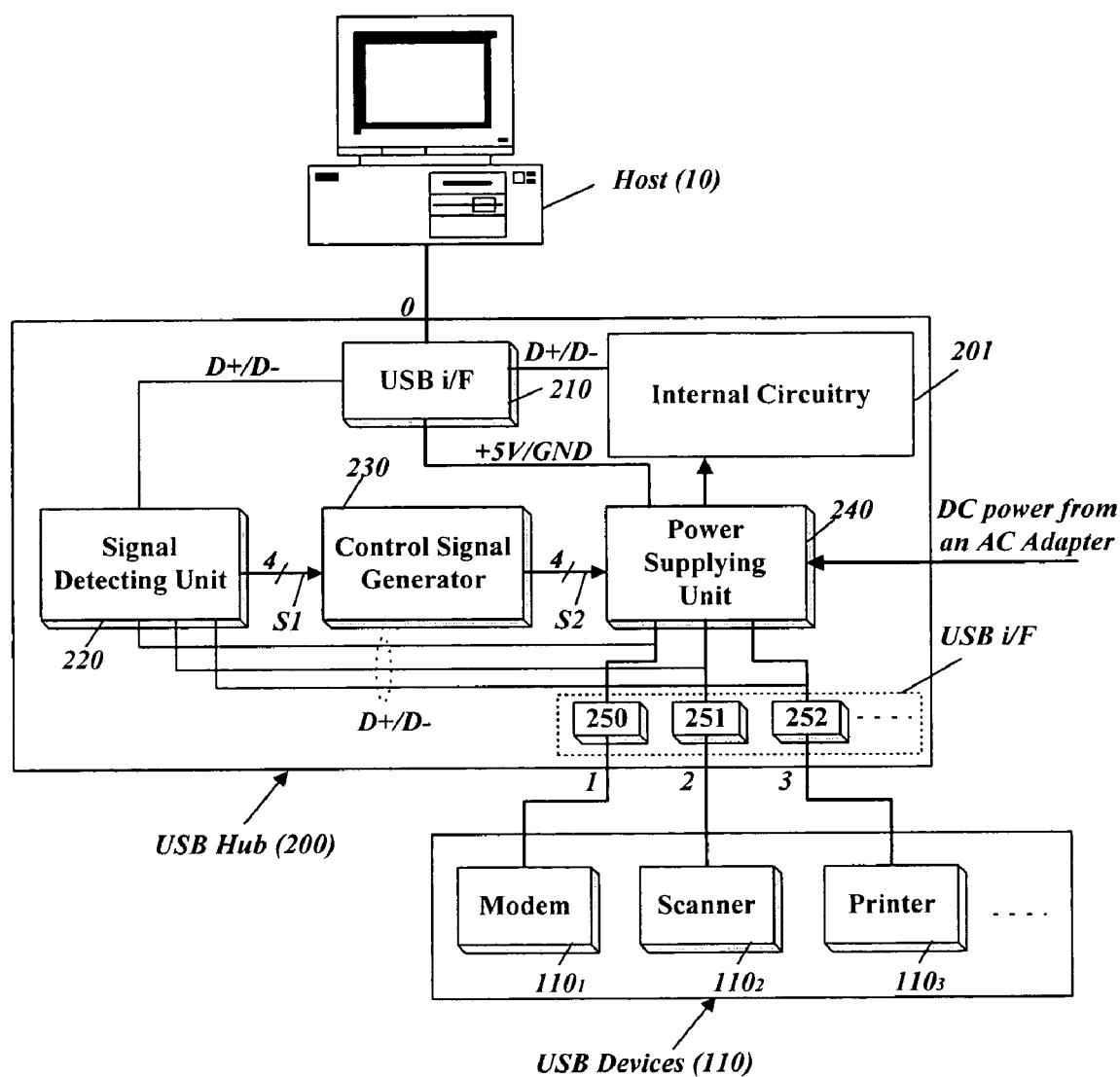
FIG. 2 is a block diagram showing a USB Hub including a preferred embodiment of a power controlling apparatus in accordance with the present invention.

In order that the invention may be fully understood, preferred embodiments thereof will now be described with reference to the accompanying drawings. FIG. 2 is a block diagram of a USB Hub in which first preferred embodiment of a power controlling apparatus in accordance with the present invention is embedded. As shown in FIG. 2, the USB Hub 200 includes several USB interface units 210, 250, 251, and 252 coupled to a host 10 and other USB devices 110 through respective USB cables (e.g., 0, 1, 2, 3), a signal detecting unit 220, a control signal generator 230, a power supplying unit 240 and internal circuitry 201. The USB includes two lines D+/D− that carry data and two lines +5V/GND that carry power. The signal detecting unit 220 detects whether or not valid signals are being carried by each of data lines D+/D− of the USB interface units 210, 250, 251, and 252. The control signal generator 230 generates power control signals S2 for preferably commanding whether or not to supply electric power for an internal circuitry 201 and/or external USB devices 110 individually or wholly in response to the detection resulting signals S1 preferably received from the signal detecting unit 220. The power supplying unit 240 provides electric power, which can be fed by the host 10 through a coupled USB or by an AC adapter (not shown), for the internal circuitry 201 and/or the other USB devices 110 or selectively shuts off the supplied electric power preferably in response to the power control signals S2.

Figure 3:
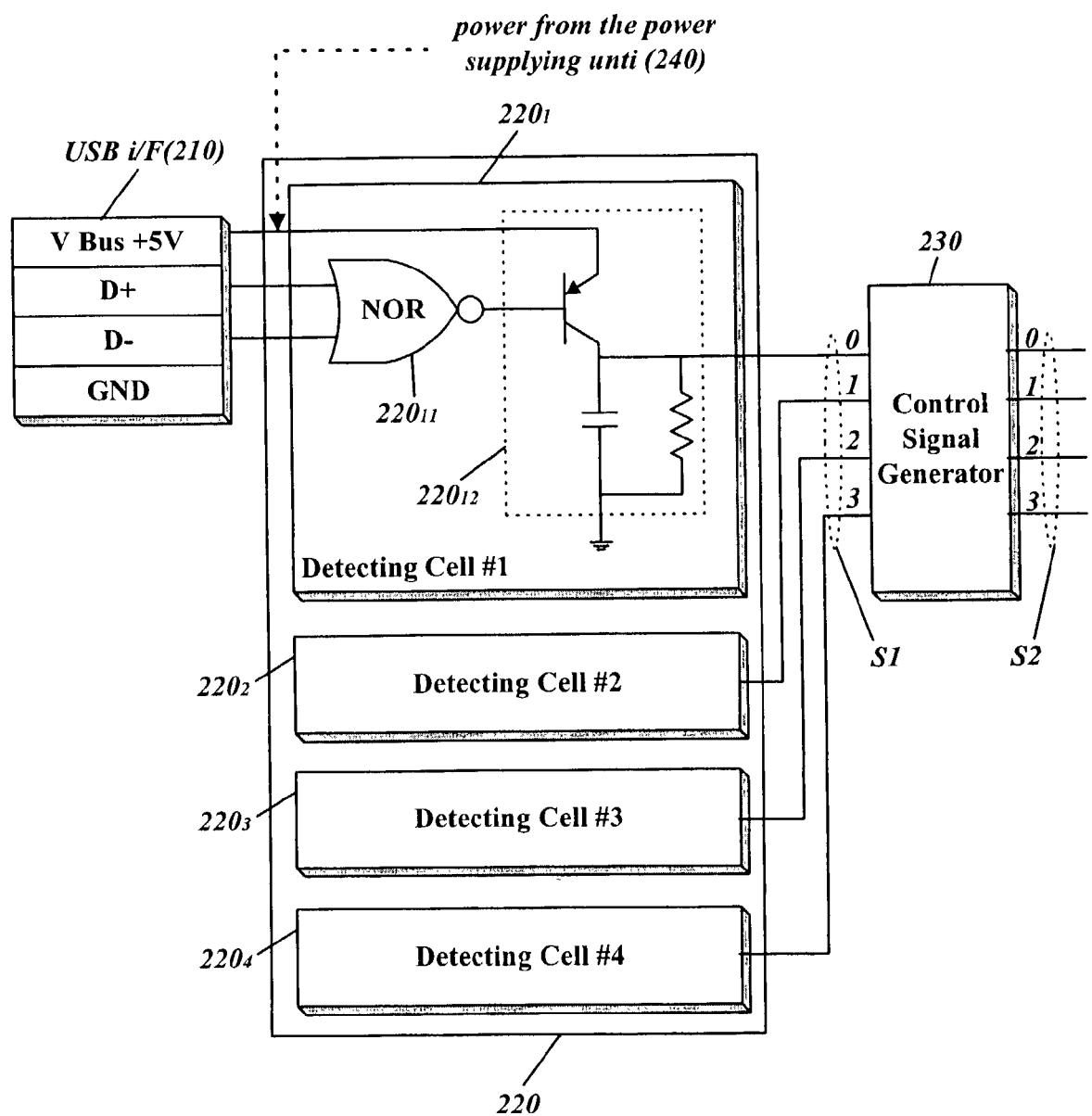
FIG. 3 is a block diagram showing a preferred embodiment of a signal detecting unit of FIG. 2.

FIG. 3 is a block diagram showing a preferred embodiment of the signal detecting unit 220 of FIG. 2. The signal detecting unit 220 as shown in FIG. 3 preferably has one detecting cell 220n for each USB interface unit such as the USB interface units 210, 250, 251, or 252. However, the present invention is not intended to be so limited.

Each detecting cell 220n is preferably composed of a NOR gate 220n1 OR-ing signals on two data lines D+/D− of a corresponding USB interface unit and inverting the OR-ed signal, and a driving stage 220n2 driving an input terminal of a coupled circuit with a current for inverting an output of the corresponding NOR-gate 220n1. Since the output of the NOR gate 220n1 is inverted again at the driving stage 220n2, the detecting cell 220n preferably conducts an OR operation of the two signals on the lines D+/D−.

An electric power used by each detecting cell 220n is preferably supplied through the power lines +5V/GND coupled to the host 10 or is supplied from the power supplying unit 240. Since each detecting cell 220n conducts an OR operation of the two signals on the lines D+/D−, if either of the two signals on the lines D+/D− is HIGH, an output or corresponding detecting cell 220n output becomes HIGH, which is applied to the control signal generator 230. Only if both signals are LOW does the input signal (e.g., S1) to the control signal generator 230 becomes LOW.

According to the USB standard, both data signal lines D+/D− cannot be in LOW state longer than 2 msec at the same time when a device coupled through a USB is in a normal operation state. Therefore, the control signal generator 230 keeps checking whether there is an input maintained LOW longer than 2 msec among the signals S1, from the signal detecting unit 220.

If one of the input signals S1 of the control signal generator 230 is LOW or a prescribed condition longer than a prescribed period (e.g., 2 msec), the host 10 or one of the USB devices 110 coupled through the data signal lines D+/D− that is making the one of the signals S1 LOW longer than the prescribed period is inoperative or is turned off, or a corresponding USB cable is disconnected or inoperative. Therefore, the control signal generator 230 preferably indicates by making transition HIGH to LOW the one output corresponding to the input in LOW longer than 2 msec or all outputs.

Thus, if the input k being an integer greater than one (i.e., not 0) is LOW longer than 2 msec the corresponding output k is made LOW. However, if the input 0 is LOW longer than 2 msec preferably all outputs 0 through 3 are made LOW. All outputs are made LOW when the input 0 is LOW longer than 2 msec because the input 0 reflects an operation state of the host 10. Preferably, all peripheral devices need not be operative if the host 10 is not in normal operations, turned-off, or has its USB cable disconnected or failed. However, the present invention is not intended to be so limited.

The power supplying unit 240 preferably shuts off electric power corresponding to a LOW-stated control signal among the outputs S2 of the control signal generator 230. Preferably, if the input 0 is LOW, electric power supplied for the internal circuitry 201 is shut off by the power supplying unit 240, if the input 1 is LOW electric power for a modem $110_1$ is shut off, if the input 2 is LOW electric power for a scanner $110_2$ is shut off, and if the input 3 is LOW electric power for a printer $110_3$ shut off.

Consequently, when the host 10 is not in normal operations or normal data communication operation, the USB Hub 200 stops entire power supply for its internal circuitry and all coupled USB devices, and when an individual USB device coupled to its USB port is not in normal operation or normal data communication operation, electric power for only the individual USB device is shut off. Thus, unnecessary power consumption is remarkably reduced.

In the first preferred embodiment, of the power controlling apparatus, whether data signal lines D+/D− are all maintained LOW longer than 2 msec is checked for each of the USB devices 110 coupled to the USB Hub 200. However, a lasting time of not-changing state on either of data signal line D+/D− pairs could alternatively be detected. In such an embodiment, if the detected lasting time exceeds a predetermined time, namely, if one of the devices 110 does not communicate data for relatively good time, a power control signal for that device is made LOW to command the power supplying unit 240 to shut off electric power supplied for that device.

Figure 4:
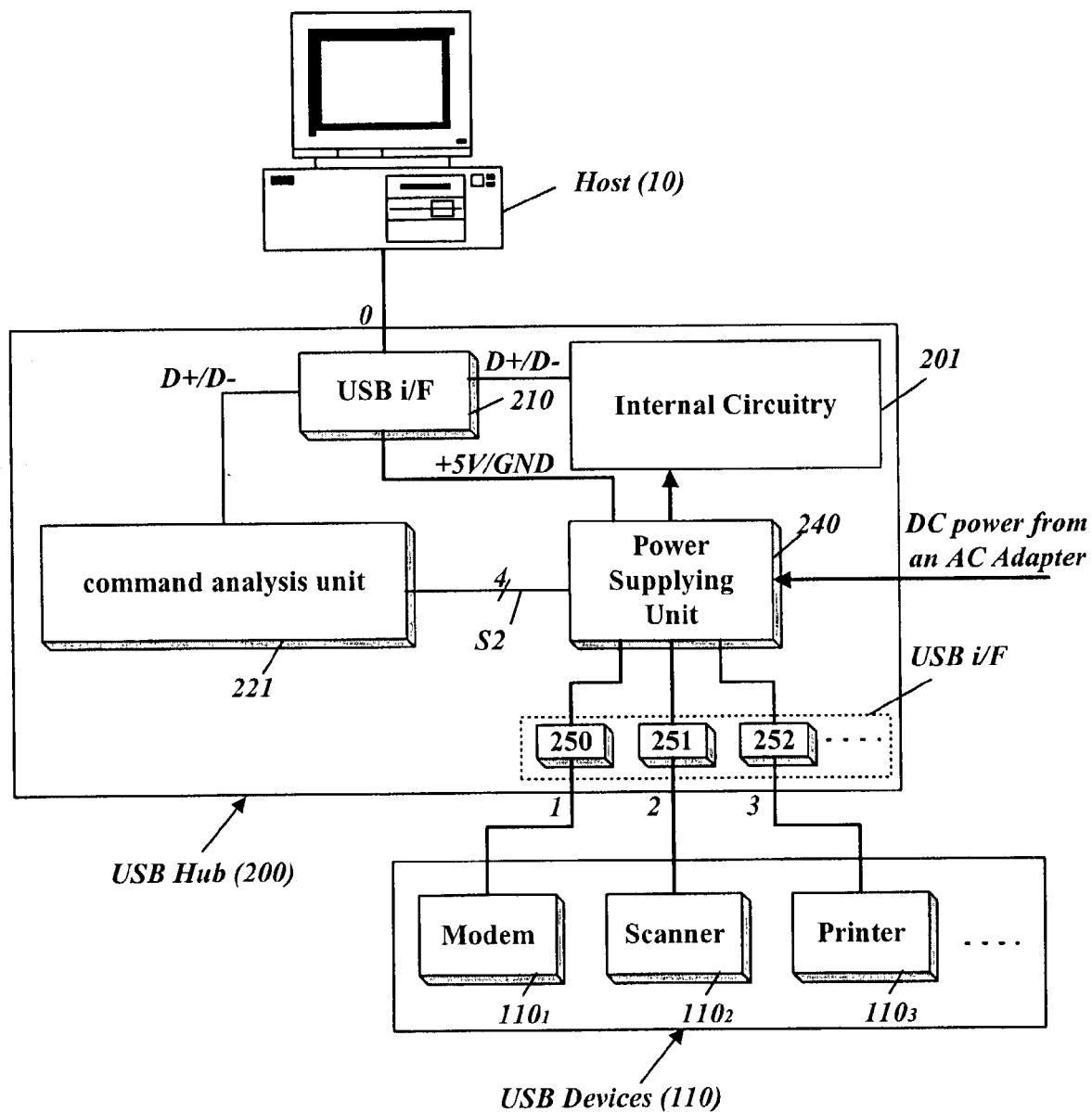
FIG. 4 is a block diagram showing a USB Hub including another preferred embodiment of a power controlling apparatus in accordance with the present invention.

FIG. 4 is a block diagram showing a second preferred embodiment of a power controlling apparatus in accordance with the present invention. Again, the second preferred embodiment of the power controlling apparatus is embedded in a USB Hub. However, the present invention is not intended to be so limited.

The power controlling apparatus embedded in the USB Hub as shown in FIG. 4 preferably conducts power supply controlling operations based on commands received from the host 10. For such controlling operations, the apparatus includes a command analysis unit 221, instead of the signal detecting unit 220 and the control signal generator 230 of FIG. 3. As shown in FIG. 4, the command analysis unit 221 interprets signals received from the host 10 or carried via the data signal lines D+/D−.

The command analysis unit 221 preferably detects signals carried via the data signal lines D+/D− coupled to the host 10, converts the detected signals to serial data, arranges the serial data to match with the USB signal format, and extracts data bits in data window at pre-specified bit position. If necessary, the command analysis unit 221 creates data bits and transmits the created data bits to the host 10 through the data signal lines D+/D−.

If the extracted data bits represents one of pre-defined command control codes (e.g., power command codes), the command interpreting unit 221 conducts corresponding power control operations indicated by the command control codes. Otherwise, the command analysis unit 221 discards the data bits since they are general data to be communicated between the host 10 and one of the USB devices 110.

If the extracted command control code is indicative of host 10 abnormal operations, the command interpreting unit 221 makes all outputs S2 LOW to shut off all electric power supplied for the internal circuitry 201 and the coupled USB devices 110. In the USB Hub 200, only internal circuitry 201 is turned off, so that the command analysis unit 221 can still receive and interpret signals from the host 10.

When the USB devices 110 and USB Hub 200 do not communicate with the host 10 for a predetermined time preferably determined periodically, the host 10 preferably sends the command control code to turn off the corresponding power provided. However, even during power off, the communication logic of the USB devices 110 should be supplied of minimal or sufficient power to detect a communication restarting signal from the host 10. In a power-off state when a power-on command control code is received from the host 10, the command analysis unit 221 makes the corresponding outputs S2 HIGH in order that the internal circuitry 201 and the USB devices 110 might be selectively supplied again with electric power.

In the second preferred embodiment of the power controlling apparatus, USB devices may create data (e.g., command control codes) indicative of 'power-using or not' and periodically transmit such data to the host 10. When the internal circuitry 201 and the USB devices 110 conduct such a function, the command analysis unit 221 keeps watching signals carried via the data signal lines D+/D− to determine which USB device is not periodically sending the data indicative of 'power-using or not' to the host 10. When one USB device is identified, a power control signal commanding power-off of that USB device is applied to the power supplying unit 240 to shut off power supply for the identified USB device.

Figure 5:
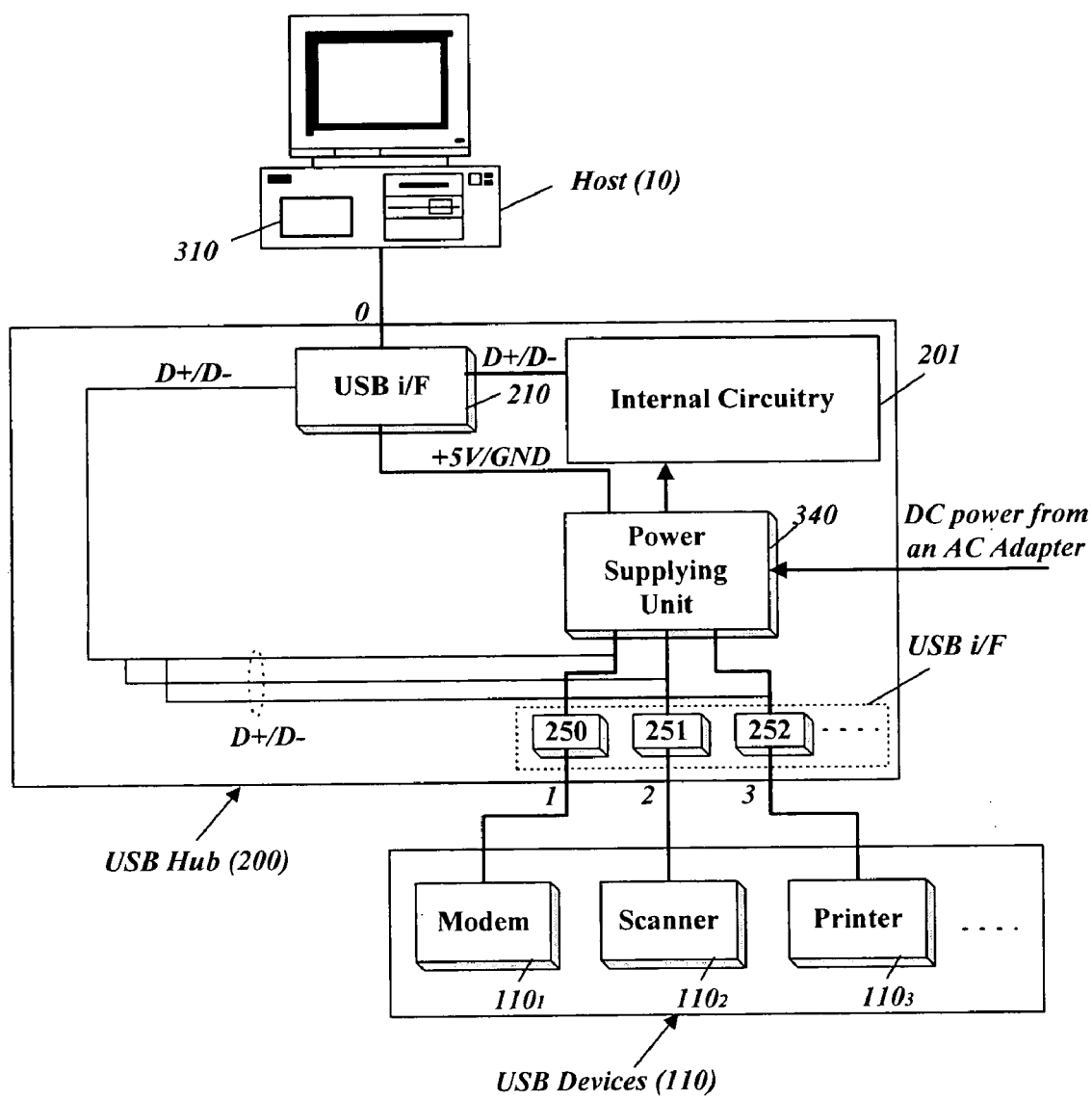
FIG. 5 is a block diagram showing a PC including another preferred embodiment of a power controlling apparatus in accordance with the present invention.

FIG. 5 is a block diagram showing a third preferred embodiment of a power controlling apparatus in accordance with the present invention. The third preferred embodiment of the power controlling apparatus is embedded in a host computer such as the host 10.

A power controlling apparatus 310 embedded in the host computer as shown in FIG. 5 and operations thereof can reduce or prevent unnecessary power consumption of one or more USB devices 110 coupled to the host 10 directly or through a hub 200. The hub 200, the internal circuitry 201 and USB i/F 210 thereof can be optional in the preferred embodiments.

The USB devices 110 and/or internal circuitry 201 receive power via power supplying unit 340, which is preferably controlled by the host 10 using the power controlling apparatus 310. The power supplying unit 340 is preferably similar to the power supplying unit 240 described above. However, the present invention is not intended to be so limited as other power control schemes that supply power as directed can be used. Further, FIG. 5 shows only the power signals passing via the power supplying device 340. However, the data signals D+/D− to the USB devices could also be transmitted via the power supplying device 340.

The power controlling apparatus 310 can be implemented using the system of the first or second preferred embodiments. Thus, the power controlling apparatus 310 can implement the functions of the signal detector 210 and the control signal generator 230 or can implement functions of the command analysis unit 221 as described above with reference to FIGS. 2-4. Thus, the power controlling apparatus 310 preferably detects a state of and/or interprets data signals of the USB cables (e.g., 0, 1, 2, 3). Results of operations of the power controlling apparatus 310 are preferably sent to the power supply unit 340 or the like that controls power for the USB devices 110 and/or the internal circuitry 221. The results can be sent downstream from the power controlling apparatus 310 via the USB cable 0 or the like. For example, when the USB devices 110 (e.g., modem) are not active (e.g., because data is not transmitted for a prescribed time), the power controlling apparatus can set a command to a preset value and transmit the same to the power supplying unit 340. Thus, similar to the first and second preferred embodiments, the power controlling apparatus 310 can individually or wholly reduce or stop power supply to selectively to one or more of the USB devices 110. If the USB hub 200 is included, data signals D+/D− transmitted over data lines (e.g., 0) are analyzed to determine an active or inactive status of the internal circuitry 201.

As described above, preferred embodiments of power control apparatus and methods according to the present invention have various advantages. The preferred embodiments of power control apparatus and method for USB devices can reduce or prevent unnecessary power consumption of one or more USB devices coupled to a host. Preferred embodiments can monitor conduction of signals transmitted via data lines, detect a state of signals transmitted via data lines or interpret detected signals transmitted via data lines. Further such operations can be performed in a host PC, a data hub or directly for a coupled data line.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power supply controlling apparatus embedded in a hub device capable of communicating data with a connected host and coupled devices, comprising:
   a data detector configured to output a power control signal in response to states of signals carried by data lines correspondingly coupled between the hub device and bus-powered coupled devices;
   a power supply device in the hub device configured to supply power to the bus-powered coupled devices; and a controller in the hub device configured to selectively shut off power supply from the hub device for the bus-powered coupled devices based on the outputted power control signal, wherein the controller is configured to stop power supply from said power supply device for one bus-powered coupled device responsive to the power control signal when the states of the signals represent an inoperative state of said one bus-powered coupled device, and wherein the controller is configured to maintain the power supply from said power supply device responsive to said power control signal for at least one other bus-powered coupled device, wherein the data detector conducts a logical operation on the signals of the data lines, and monitors a time interval for a result of the logical operation maintained at a prescribed one of a plurality of levels, and outputs the power control signal based on the monitored time interval.

2. The apparatus of claim 1, wherein a first state of the signals is the inoperative state of the coupled devices when the signals on the data lines are maintained one level longer than a prescribed interval.

3. The apparatus of claim 2, wherein the level is low and the prescribed interval is 2 msec.

4. The apparatus of claim 1, wherein the data detector detects the states of the signals carried via the data lines coupled to a corresponding one of said bus-powered coupled devices, and outputs the power control signal to shut off power supply for the corresponding one of the bus-powered coupled devices based on the detected states of the signals from the corresponding data lines coupled to said corresponding one of said bus powered devices.

5. The apparatus of claim 4, wherein the data lines are signal lines designated D+ and D− in Universal Serial Bus (USB) standard and the devices are USB devices.

6. The apparatus of claim 1, wherein the data detector conducts an OR-ing operation of the signals on the data lines, detects a lasting time of one prescribed level of the OR-ed result, and outputs the power control signal based on the detected lasting time.

7. A power supply controlling apparatus embedded in a hub device capable of communicating data between a host and coupled Serial Bus (SB) devices, comprising:
 a data detector that detects a signal indicative of power consumption, the signal being carried via Serial Bus (SB) data lines connected between the hub device and a plurality of coupled SB devices, wherein the data detector outputs a power control signal based on whether the signal is detected;
 a power supply in the hub device configured to supply power to the plurality of coupled SB devices; and
 a controller that controls the power supply to individually and independently shut-off power for the plurality of coupled SB devices based on the outputted power control signal, wherein the data detector outputs the power control signal commanding to stop power supply for one of said plurality of SB devices when signals on first and second data lines from the corresponding SB device are not detected within a transmitting period, wherein the data detector detects signals between the hub and the other devices for each of the other devices and outputs power control signals for said each of the other devices, and wherein the first and second data lines are signal lines designated D+ and D−, and wherein the serial bus and the serial bus devices operate according to a Universal Serial Bus standard, wherein the data detector conducts a logical operation on the signals of the first and second data lines, and monitors a time interval for a result of the logical operation maintained at a prescribed one of a plurality of levels, and outputs the power control signal based on the monitored time interval.

8. The apparatus of claim 7, wherein the signal indicative of power consumption is transmitted periodically.

9. A computer system, comprising:
 a host computer;
 a plurality of bus-powered downstream Serial Bus (SB) devices coupled to the host computer, each device selectively having at least a status of active and inactive, wherein data signals are communicated between the host computer and each of the downstream SB devices on a respective pair of first and second data lines connected to said each of the downstream SB devices;
 a power supply device in a hub configured to supply power to the plurality of downstream SB devices; and
 a controller that analyzes the data signals communicated between the host computer and each of the downstream SB devices on the respective pairs of the first and second data lines, wherein said supplied power from said power supply device to at least one of the SB devices is stopped when the analysis of the data signals indicates abnormal communications are being transferred between the host computer and said at least one of the downstream SB devices on a corresponding pair of the first and second data lines and said supplied power is maintained from said power supply device to remaining downstream SB devices when said analysis of the data signals indicates said active status, wherein the controller conducts a logical operation on the data signals passing in downstream data lines, monitors a time interval of a resulting signal of the logical operation for maintaining a prescribed one of a plurality of levels, and outputs power control signals based on the monitored time intervals.

10. The computer system of claim 9, further comprising a Serial Bus (SB) hub coupled between the host computer and the plurality of bus-powered downstream SB devices connected downstream of the hub, wherein the controller is in one of the host computer and the hub.

11. The computer system of claim 10, wherein said power supply device in the hub coupled to the plurality of the bus-powered downstream SB devices stops power supply to one or more of the plurality of bus-powered downstream SB devices based on power signals transmitted on downstream data lines from the one or more of the plurality of bus-powered downstream SB devices.

12. The computer system of claim 9, wherein said power supply device is in a SB hub connected between the host and the plurality of bus-powered downstream Serial Bus (SB) devices connected downstream of the SB hub, wherein the power supply device individually and independently stops power supply to one or more of the plurality of bus-powered downstream SB devices based on power signals from one or more other ones of the plurality of bus-powered downstream SB devices, wherein the analysis performs one of detecting a state of the data signals and interpreting detected data signals.

13. The computer system of claim 9, wherein the controller is located in the host computer.

14. The computer system of claim 13, wherein said power supply device stops power supply to one or more of the plurality of bus-powered downstream SB devices based on power signals from the plurality of bus-powered downstream SB devices.

15. The computer system of claim 14, wherein the analysis performs one of detecting a state of the data signals and interpreting detected data signals.

16. A method of controlling power to devices connected to a hub device that is connected to a host computer, comprising:
   analyzing signals transmitted via pairs of first and second data lines of a Serial Bus respectively connected between the hub device and each of the connected devices;
   providing a power supply individually to said each of the connected devices from the hub device;
   determining a power control signal when the analysis of the signals transmitted between the hub device and at least one of the connected devices indicates abnormal communications in a corresponding one of said pairs of said first and second data lines; and
   selectively controlling the power supplied to individually and independently shut off power for the connected devices based on the power control signal, wherein the power supply is stopped for one of said connected devices when the signals on the first and second data lines from the corresponding connected device is not detected within a transmitting period responsive to the power control signal, wherein the power control signal is determined for each of the connected devices, and wherein the power supply is maintained for remaining connected devices responsive to the power control signal, wherein determining the power control signal includes conducting a logical operation on the signals of the data lines, monitoring a time interval for a result of the logical operation maintained at a prescribed one of a plurality of levels, and providing the power control signal based on the monitored time interval.

17. The method of claim 16, wherein the Serial Bus is a Universal Serial Bus, wherein analyzing the signals comprises at least one of (1) detecting a state of data signals passing via a USB interface between each of the connected devices and the host computer, and (2) interpreting detected data signals transmitted by the host computer and USB devices.

18. The method of claim 16, wherein the analyzed signals transmitted via data lines are transmitted from a Universal Serial Bus (USB) hub to downstream bus-powered USB devices, wherein the downstream analyzed signals are analyzed in the USB hub providing power to the bus-powered USB devices, wherein at least one USB device has power shut off by the USB hub while at least one other USB device has power maintained by the USB hub responsive to the power control signal.

* * * * *